(12) United States Patent
Lutz et al.

(10) Patent No.: US 9,603,346 B2
(45) Date of Patent: Mar. 28, 2017

(54) AQUARIUM LIGHTING SYSTEM

(71) Applicant: Elive LLC, New Berlin, WI (US)

(72) Inventors: Thomas Lutz, Cedar Rapids, IA (US); Matthew Allen, Waterford, WI (US)

(73) Assignee: ELIVE LLC, Muskego, WI (US)

( * ) Notice: Subject to any disclaimer, the term of this patent is extended or adjusted under 35 U.S.C. 154(b) by 155 days.

(21) Appl. No.: 14/202,557

(22) Filed: Mar. 10, 2014

(65) Prior Publication Data

US 2014/0305376 A1    Oct. 16, 2014

Related U.S. Application Data

(60) Provisional application No. 61/812,302, filed on Apr. 16, 2013.

(51) Int. Cl.
*A01K 63/06* (2006.01)
*A01K 63/00* (2017.01)

(52) U.S. Cl.
CPC ............ *A01K 63/06* (2013.01); *A01K 63/003* (2013.01)

(58) Field of Classification Search
CPC ...... A01K 63/06; A01K 63/00; A01K 63/003; A01K 63/006
USPC ....... 119/267, 245, 246, 247, 248, 253, 265, 119/266
See application file for complete search history.

(56) References Cited

U.S. PATENT DOCUMENTS

| | | |
|---|---|---|
| 2,988,312 A | 8/1961 | Macdonald |
| 3,687,110 A | 8/1972 | Braunhut |
| 3,805,740 A | 4/1974 | Hall |
| 3,828,176 A | 8/1974 | Goldman et al. |
| 3,834,351 A | 9/1974 | Schmidt |
| 3,874,336 A * | 4/1975 | Murphy ............... A01K 63/003 119/257 |
| 4,694,223 A | 9/1987 | Campolo |
| 4,727,448 A | 2/1988 | Hanyuda et al. |
| 4,994,943 A | 2/1991 | Aspenwall |
| 5,089,940 A | 2/1992 | Lanzarone et al. |
| 5,165,778 A | 11/1992 | Matthias et al. |
| 5,211,469 A | 5/1993 | Matthias et al. |
| 5,307,762 A | 5/1994 | Englert |
| 5,471,952 A * | 12/1995 | Tsuchiya ................ A01K 63/06 119/266 |
| 5,848,837 A | 12/1998 | Gustafson |
| 5,873,326 A | 2/1999 | Davet et al. |
| 5,927,845 A | 7/1999 | Gustafson |
| 5,943,198 A | 8/1999 | Hirsh et al. |

(Continued)

OTHER PUBLICATIONS

"EcoQube—Desktop Ecosystem That Grows Flowers and Herbs", by Aqua Design Innovations, https://www.kickstarter.com/projects/kevinzl/ecoqube-desktop-ecosystem-that-grow-flowers-and-he, Dec. 30, 2013 (25 pages).

*Primary Examiner* — Trinh Nguyen
(74) *Attorney, Agent, or Firm* — Michael Best & Friedrich LLP

(57) ABSTRACT

An aquarium includes a curved aquarium housing that supports water, the water including a water surface that separates water from air within the housing. The aquarium also includes a lighting system coupled to the aquarium housing, the lighting system including an arm and a light element disposed at an end of the arm and outside of the aquarium housing that directs light into the aquarium housing at an angle less than 90 degrees relative to the water surface.

14 Claims, 4 Drawing Sheets

(56) References Cited

U.S. PATENT DOCUMENTS

| | | |
|---|---|---|
| 6,029,604 A | 2/2000 | Vosjoli et al. |
| 6,065,849 A | 5/2000 | Chen |
| 6,166,496 A | 12/2000 | Lys et al. |
| 6,184,628 B1 | 2/2001 | Ruthenberg |
| 6,187,394 B1 | 2/2001 | Johnson et al. |
| 6,523,976 B1 | 2/2003 | Turnbull et al. |
| 6,577,080 B2 | 6/2003 | Lys et al. |
| 6,673,292 B1 | 1/2004 | Gustafson et al. |
| 6,781,329 B2 | 8/2004 | Mueller et al. |
| 6,921,182 B2 | 7/2005 | Anderson, Jr. et al. |
| 6,967,448 B2 | 11/2005 | Morgan et al. |
| 7,024,814 B1 | 4/2006 | McDougle |
| 7,185,997 B2 | 3/2007 | Simoni |
| 7,187,141 B2 | 3/2007 | Mueller et al. |
| 7,220,018 B2 | 5/2007 | Crabb et al. |
| 7,221,104 B2 | 5/2007 | Lys et al. |
| 7,258,459 B2 | 8/2007 | Wang |
| 7,307,391 B2 | 12/2007 | Shan |
| 7,427,840 B2 | 9/2008 | Morgan et al. |
| 7,436,134 B2 | 10/2008 | Levine |
| 7,453,217 B2 | 11/2008 | Lys et al. |
| 7,473,008 B2 | 1/2009 | Crabb et al. |
| 7,482,764 B2 | 1/2009 | Morgan et al. |
| 7,500,776 B1 | 3/2009 | Buczko |
| 7,543,952 B1 | 6/2009 | Chang |
| 7,845,814 B2 | 12/2010 | Crabb et al. |
| 7,878,674 B2 | 2/2011 | Crabb et al. |
| 7,946,729 B2 | 5/2011 | Ivey et al. |
| 8,057,060 B2 | 11/2011 | Fredricks |
| 8,100,087 B2 | 1/2012 | Fredricks |
| 8,113,147 B1 * | 2/2012 | Wang ............... A01K 63/06 119/267 |
| 8,115,411 B2 | 2/2012 | Shan |
| 8,222,833 B2 | 7/2012 | Lin |
| 8,230,815 B2 | 7/2012 | Fredricks |
| 8,232,745 B2 | 7/2012 | Chemel et al. |
| 8,256,924 B2 | 9/2012 | Simon et al. |
| 8,299,695 B2 | 10/2012 | Simon et al. |
| 2007/0234967 A1 * | 10/2007 | Margerum ......... A01K 63/003 119/257 |
| 2008/0266836 A1 * | 10/2008 | Hadley ............... A01K 63/06 362/101 |

* cited by examiner

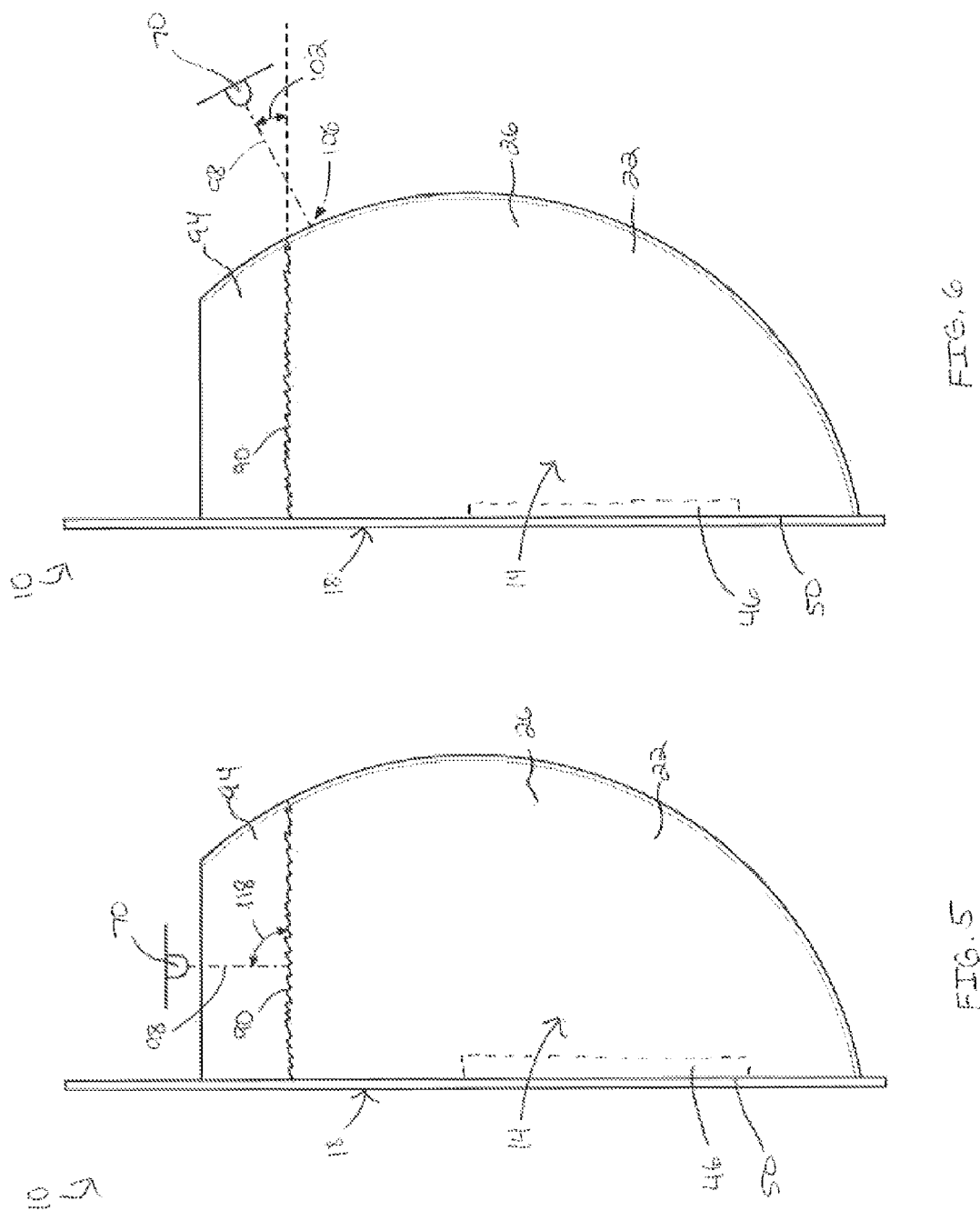

AQUARIUM LIGHTING SYSTEM

CROSS-REFERENCE TO RELATED APPLICATIONS

This application claims priority to U.S. Provisional Application No. 61/812,302, filed Apr. 16, 2013, the entire contents of which are incorporated herein by reference.

FIELD OF THE INVENTION

The present invention relates to an aquarium lighting system, and in particular to an aquarium lighting system for a semi-spherical aquarium.

BACKGROUND OF THE INVENTION

Aquariums often include lighting systems that provide plant and coral sustenance, as well as daytime and nighttime illumination of water, fish, and/or other elements within the aquarium. While the lighting systems are designed to direct light into the aquarium, often a portion of the directed light becomes refracted by the water within the aquarium or by the shape of the aquarium housing itself. This refracted light creates undesirable lighting effects (e.g., streaks, patterns, etc.) upon walls, floors, ceilings, etc. surrounding the aquarium.

SUMMARY

In accordance with one construction, an aquarium includes a curved aquarium housing that supports water, the water including a water surface that separates water from air within the housing. The aquarium also includes a lighting system coupled to the aquarium housing, the lighting system including an arm and a light element disposed at an end of the arm and outside of the aquarium housing that directs light into the aquarium housing at an angle less than 90 degrees relative to the water surface.

In accordance with another construction, an aquarium includes a curved aquarium housing that supports water, the water including a water surface that separates water from air within the housing. The aquarium also includes a lighting system coupled to the aquarium housing, the lighting system including an arm extending from the lighting system housing and a light element disposed at an end of the arm and outside of the aquarium housing that directs a beam of light against the curved aquarium housing at a point on the curved aquarium housing that is below the water surface, without the beam of light being directed directly through the water surface.

In accordance with another construction, an aquarium includes a semi-spherical wall formed from a substantially transparent material, a substantially flat back panel coupled to and cooperating with the semi-spherical wall to define a space that contains a volume of water having a water surface that separates the water from air, a background element coupled to the back panel and visible through the semi-spherical wall, a lighting housing coupled to the semi-spherical wall, an arm including a first end coupled to the light housing and a second end extending from the light housing, and a light supported by the arm and positioned near the second end, the light arranged to direct light through the semi-spherical wall and into the space to illuminate the background element.

Other aspects of the invention will become apparent by consideration of the detailed description and accompanying drawings.

BRIEF DESCRIPTION OF THE DRAWINGS

FIG. 5 is a schematic side view of the aquarium, illustrating an angle of light emission.

FIG. 6 is a schematic side view of the aquarium, illustrating an improved angle of light emission.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
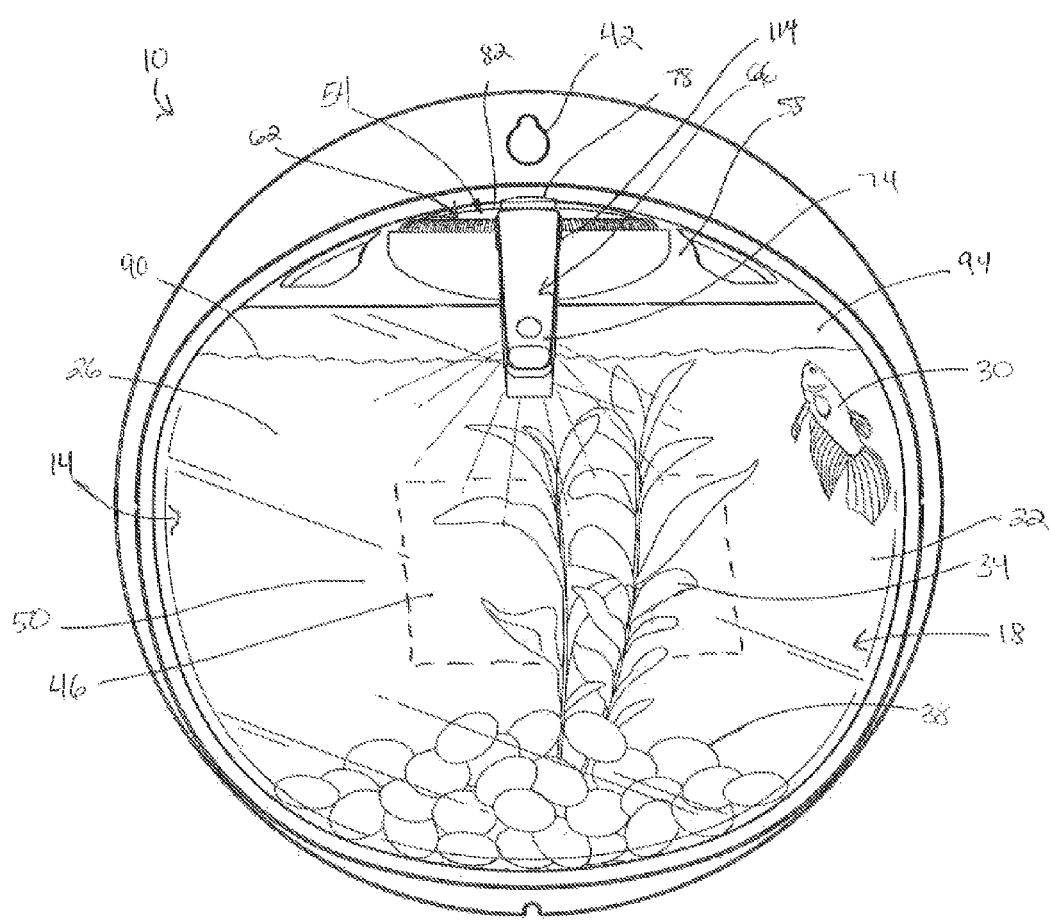
FIG. 1 is a front view of an aquarium according to one construction.

FIGS. 1-6 illustrate an aquarium 10 that has a curved, at least partially transparent housing 14 and a flat back panel 18 coupled to the housing 14. The illustrated aquarium 10 is semi-spherical in shape, although other constructions include different shapes and sizes than that illustrated. As illustrated in FIG. 1, the transparent housing 14 and back panel 18 cooperatively define an interior chamber 22 that holds and sustains water 26, fish 30, plants 34, gravel 38, and/or other aquatic organisms and décor. As illustrated in FIG. 1, the back panel 18 includes a notch 42 to mount (e.g., hang) the aquarium 10 on a wall. Other constructions may include different structures to mount the aquarium 10 to a wall or may simply rest on a shelf.

With reference to FIGS. 1, 2, 5, and 6, the illustrated back panel 18 is opaque and includes a background or other decorative element 46 (illustrated schematically) disposed on an interior surface 50 of the panel 18 and visible through the housing 14. The decorative element 46 is an image, design, text, or combination thereof, and takes up a portion of, or in some constructions the entire interior surface 50. In some constructions the back panel 18, or a portion of the back panel 18, is transparent. In some constructions, the back panel 18 is arranged to receive a piece of paper on which the image is printed. This arrangement allows the user to print any desired image and place that image in the back panel 18 for display.

To sustain and highlight organisms and/or décor within the aquarium 10, as well as to highlight the decorative element 46, the aquarium 10 includes a lighting system 54. The lighting system 54 is coupled to the housing 14 along a top portion 58 of the housing 14, adjacent the back panel 18. The illustrated top portion 58 is opaque, although in other constructions the top portion 58 is transparent.

Figure 3:
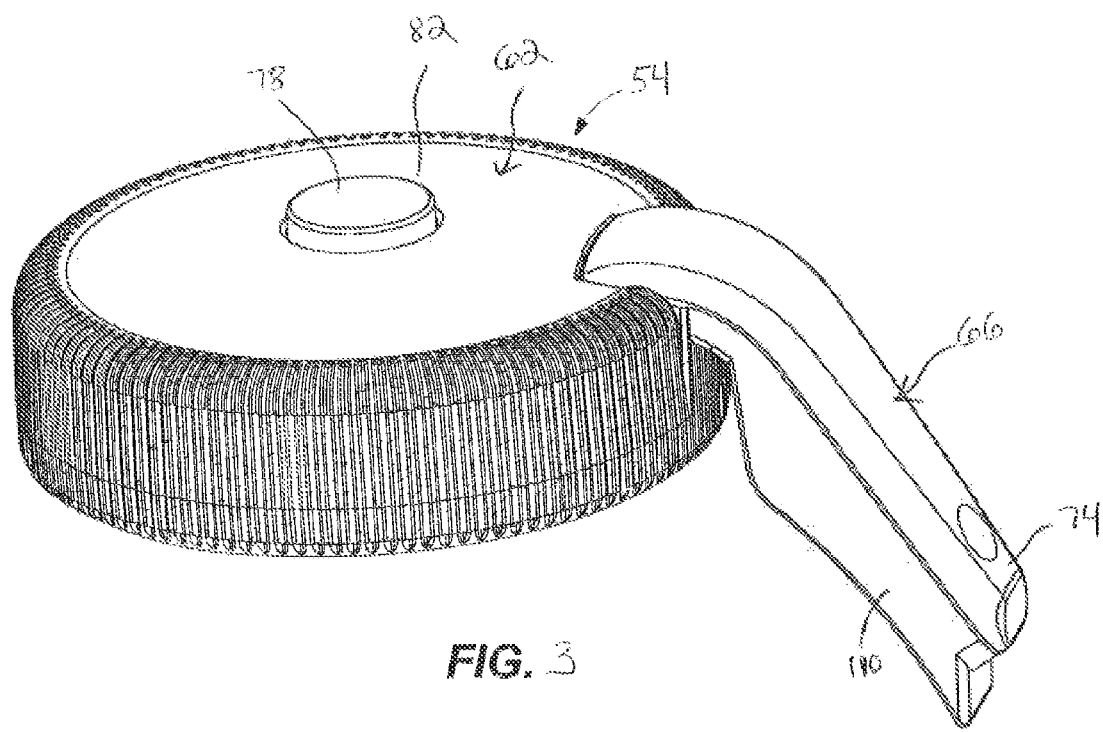
FIGS. 3 and 4 are perspective views of a lighting system of the aquarium.
Figure 4:
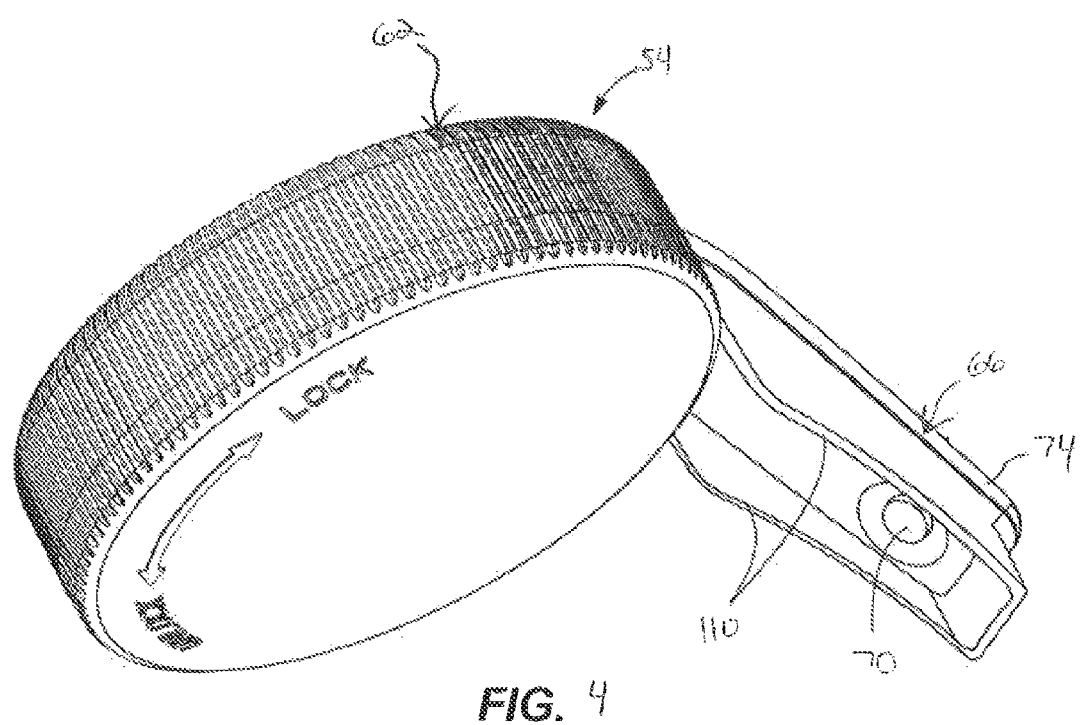

The lighting system 54, best illustrated in FIGS. 3 and 4 includes a housing 62 that houses a battery (not shown) for powering the lighting system 54. In some constructions the lighting system 54 is alternatively powered through a wired power source. As illustrated in FIGS. 3 and 4, the housing 62 is generally circular, although other constructions include different shapes and sizes than that illustrated.

With continued reference to FIGS. 3 and 4, the lighting system 54 includes a cantilevered arm 66 that extends from the housing 62, and at least one light element 70 disposed at an end 74 of the arm 66. The illustrated light element 70 is an LED, although other constructions include different types of light elements.

The lighting system 54 also includes a light switch 78 disposed on a top 82 of the housing 62 to turn the light element 70 on and off. In the illustrated construction, a push button is employed as the light switch 78 with other arrangements being possible (e.g., touch switch, motion sensor switch, toggle switch, etc.). The switch 78 is coupled to a timer 86 (illustrated schematically in FIG. 2), such that when the switch 78 is pressed to turn the light element 70 on, the timer 86 is also activated. In the illustrated construction the timer 86 keeps the light element 70 on for three hours before the light element 70 is automatically turned off, in order to conserve battery power. In some constructions the timer 86 keeps the light element 70 on for between two to four hours before the light element 70 is automatically turned off. Other constructions include different lengths of time. In some constructions the lighting system 54 does not include a timer.

With reference to FIGS. 1, 5, and 6, when the aquarium 10 is filled with water 26 that defines a water surface 90 that separates the water 82 from air 94 within the housing 14. With reference to FIG. 6, in some constructions the arm 66 is angled relative to the housing 62 and to the water surface 90 such that a light emission 98 from the light element 62 is angled at an angle 102 relative to the water surface 90. The illustrated light emission 98 is a beam of light, generally represented linearly, and defining an axis along which at least a substantial portion of the light travels out of the light element 70. The angle 102 is an acute angle, and in some constructions is substantially less than 90 degrees. In the illustrated construction the angle 98 is approximately 30 degrees. In other constructions the angle is between 20 and 40 degrees. Other constructions include different ranges and values.

As illustrated in FIG. 6, the arm 62 is further positioned such that the light emission 98 is directed toward and contacts the housing 14 at a point 106 on the housing 14 that is below the water surface 90, without the light emission 98 passing directly through the water surface 90, thereby preventing or inhibiting light from passing directly through the water surface 90.

Figure 2:
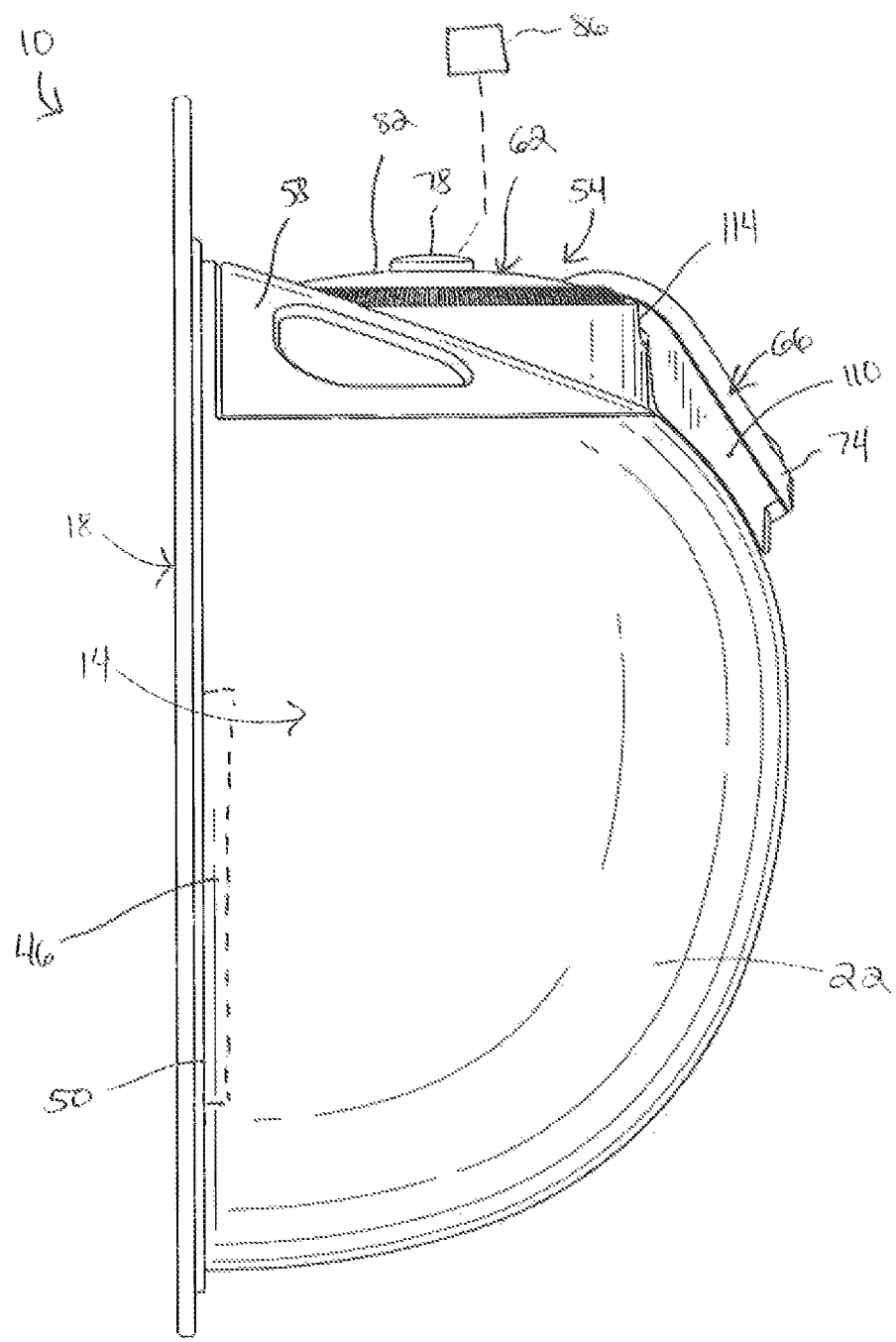
FIG. 2 is a side view of the aquarium.

With reference to FIGS. 2 and 4, the lighting system 54 also includes baffles 110 on the arm 62 that help to guide and direct the light emission 98 toward the point 106. As illustrated in FIG. 2, the baffles 110 have the same curvature as the housing 14, such that the baffles contact and extend along the housing 14, thereby preventing or inhibiting light from escaping out of the arm 62 before the light emission contacts the point 106.

With continued reference to FIG. 6, in use of the illustrated construction the angle 102 is fixed once the lighting system 54 is coupled to the housing 14. However, in other constructions the angle 102 is adjustable. For example, in some constructions the arm 66 is adjustable relative to the housing 62 to change the angle 102. In addition, some constructions may include an extendable arm that allows for the movement of the point 106 up or down the wall of the aquarium as may be desired.

With reference to FIG. 2, in the illustrated construction the lighting system 54 is also removably coupled to the housing 14. The top portion 58 includes a cut-out 114. The arm 62 rests within the cut-out 114. During use of the light element 70, the arm 62 is prevented from rotating relative to the housing 14 due to the cut-out 114. However, when the lighting system 54 is to be removed (e.g., to replace a battery), the arm 62 (along with the remainder of the lighting system 54) is simply lifted out of the cut-out 114.

In use, the arrangement and positioning of the arm 62, baffles 110, and light element 70 illustrated in FIGS. 1-4 and 6 minimizes or prevents undesired diffraction and reflection effects (e.g., extraneous rays or bands of light emitting onto the wall, ceiling, or floor adjacent the aquarium 10, undesirable glare, and/or poor illumination of components within the aquarium 10) from the light emission 98. Specifically, the positioning of the light below the water line eliminates the need for the light to cross the air water interface. This interface is often imperfect and includes waves or ripples that can produce unwanted reflections or diffraction. For example, FIG. 5 schematically illustrates a condition in which the light emission 98 is angled perpendicular relative to the water surface 90 at an angle 118. When the light emission 98 is angled perpendicular relative to the water surface 90, the light emission 98 diffracts and reflects off of the water surface 90 (and particularly off of imperfections, waves, or ripples on the surface) and the housing 14, and generates undesired light patterns and light emissions (e.g., rays or bands of light) out of the aquarium 10 and up onto the wall, ceiling, or down onto the floor, along with glare and/or poor illumination of the components within the aquarium 10.

By using a lower angle like angle 102 and directing the light emission 98 toward the point 106 below the water surface 90, the light system 54 utilizes the existing geometry and optics of the housing 14 to harness and retain power from the light element 62, and to provide more intense illumination of the water, animals, and decorative element 26 within the aquarium 10 than in FIG. 5.

Although the invention has been described in detail with reference to certain preferred embodiments, variations and modifications exist within the scope and spirit of one or more independent aspects of the invention as described.

What is claimed is:

1. An aquarium comprising:
a curved aquarium housing that supports water, the water including a water surface that separates water from air within the housing; and
a lighting system coupled to the aquarium housing, the lighting system including an arm and a light element disposed at an end of the arm and outside of the aquarium housing that directs light into the aquarium housing at an angle less than 90 degrees relative to the water surface so as to utilize the curved aquarium housing as an optic and to focus the light on at least one element within the aquarium housing, wherein the arm includes baffles that partially surround the light to inhibit the emission of light away from the aquarium, wherein the aquarium housing includes a semi-spherical wall formed from a substantially transparent material, and wherein the baffles include an edge that is contoured to match a curved contour of the semi-spherical wall.

2. The aquarium of claim 1, wherein the aquarium housing includes a flat back panel coupled to the semi-spherical wall.

3. The aquarium of claim 2, wherein the back panel includes a background decorative element that is illuminated by the light element, wherein the background decorative element is disposed inside of the aquarium housing.

4. The aquarium of claim 2, wherein the lighting system includes a lighting system housing coupled to a top portion of the aquarium housing adjacent the back panel, the lighting system housing including a battery compartment that houses a battery.

5. The aquarium of claim 1, wherein the angle is approximately 30 degrees.

6. The aquarium of claim 1, wherein the light element is an LED.

7. The aquarium of claim 1, wherein the lighting system includes a push-button that operates the light element.

8. The aquarium of claim 7, wherein the push-button controls a timer, and the timer controls how long the light element remains on before the light element automatically shuts off.

9. An aquarium comprising:
a curved aquarium housing that supports water, the water including a water surface that separates water from air within the housing; and
a lighting system coupled to the aquarium housing, the lighting system including an arm extending from the lighting system housing and a light element disposed at an end of the arm and outside of the aquarium housing that directs a beam of light against the curved aquarium housing at a point on the curved aquarium housing that is below the water surface, without the beam of light being directed directly through the water surface so as to utilize the curved aquarium housing as an optic and to focus the light on at least one element within the aquarium housing, wherein the arm includes baffles that partially surround the light to inhibit the emission of light away from the aquarium, wherein the aquarium housing includes a semi-spherical wall formed from a substantially transparent material, and wherein the baffles include an edge that is contoured to match a curved contour of the semi-spherical wall.

10. The aquarium of claim 9, further comprising a flat back panel coupled to the aquarium housing.

11. The aquarium of claim 10, wherein the lighting system includes a lighting system housing coupled to a top portion of the aquarium housing adjacent the back panel.

12. The aquarium of claim 10, wherein the back panel includes a background decorative element that is illuminated by the light element, wherein the background decorative element is disposed inside of the aquarium housing.

13. The aquarium of claim 1, wherein the angle is fixed when the lighting system is coupled to the aquarium housing.

14. The aquarium of claim 9, wherein the arm is fixed relative to the aquarium housing when the lighting system is coupled to the aquarium housing.

* * * * *